United States Patent [19]
Keehn et al.

[11] Patent Number: 5,155,627
[45] Date of Patent: Oct. 13, 1992

[54] UNIVERSAL BEZEL AND ANTI-GLARE FILTER FOR MONITORS

[75] Inventors: Donald L. Keehn, Healdsburg; David L. Soberanis, Santa Rosa; Russell E. Barbaria, Windsor, all of Calif.

[73] Assignee: Optical Coating Laboratory, Inc., Santa Rosa, Calif.

[21] Appl. No.: 771,270

[22] Filed: Oct. 4, 1991

[51] Int. Cl.[5] ............................................. G02B 17/00
[52] U.S. Cl. .................................... 359/609; 359/601; 358/252
[58] Field of Search ............... 359/614, 601, 609, 610, 359/611, 613, 894; 358/247, 245, 250, 252, 254, 253

[56] References Cited

U.S. PATENT DOCUMENTS

| | | | |
|---|---|---|---|
| 4,529,268 | 7/1985 | Brown | 359/601 |
| 4,577,928 | 3/1986 | Brown | 359/497 |
| 4,712,870 | 12/1987 | Robinson et al. | 359/738 |
| 4,834,330 | 5/1989 | Swillinger | 248/205.2 |
| 4,864,190 | 9/1989 | Orr | 358/252 |
| 5,069,529 | 12/1991 | Takahashi | 359/601 |

OTHER PUBLICATIONS

MISCO Catalog, p. 30, an undated catalog believed to have been issued as early as Apr., 1990.
MISCO Preview of New Products Catalog, Spring 1990, pp. 2C–8C.
UARCO Catalog, Fall 1989, p. 43.

*Primary Examiner*—Loha Ben
*Attorney, Agent, or Firm*—Philip A. Dalton

[57] ABSTRACT

An optical screen or cover for computer monitors and other video displays comprises a frame to which is mounted an optical plate such as an anti-glare screen, and a concave, U-shaped lip which is mounted to the rear of the frame along three sides of the frame. The lip slides onto and off the monitor for mounting and removing the cover. Also, the lip adapts to monitors of different sizes and provides a snug, custom-appearing fit.

10 Claims, 2 Drawing Sheets

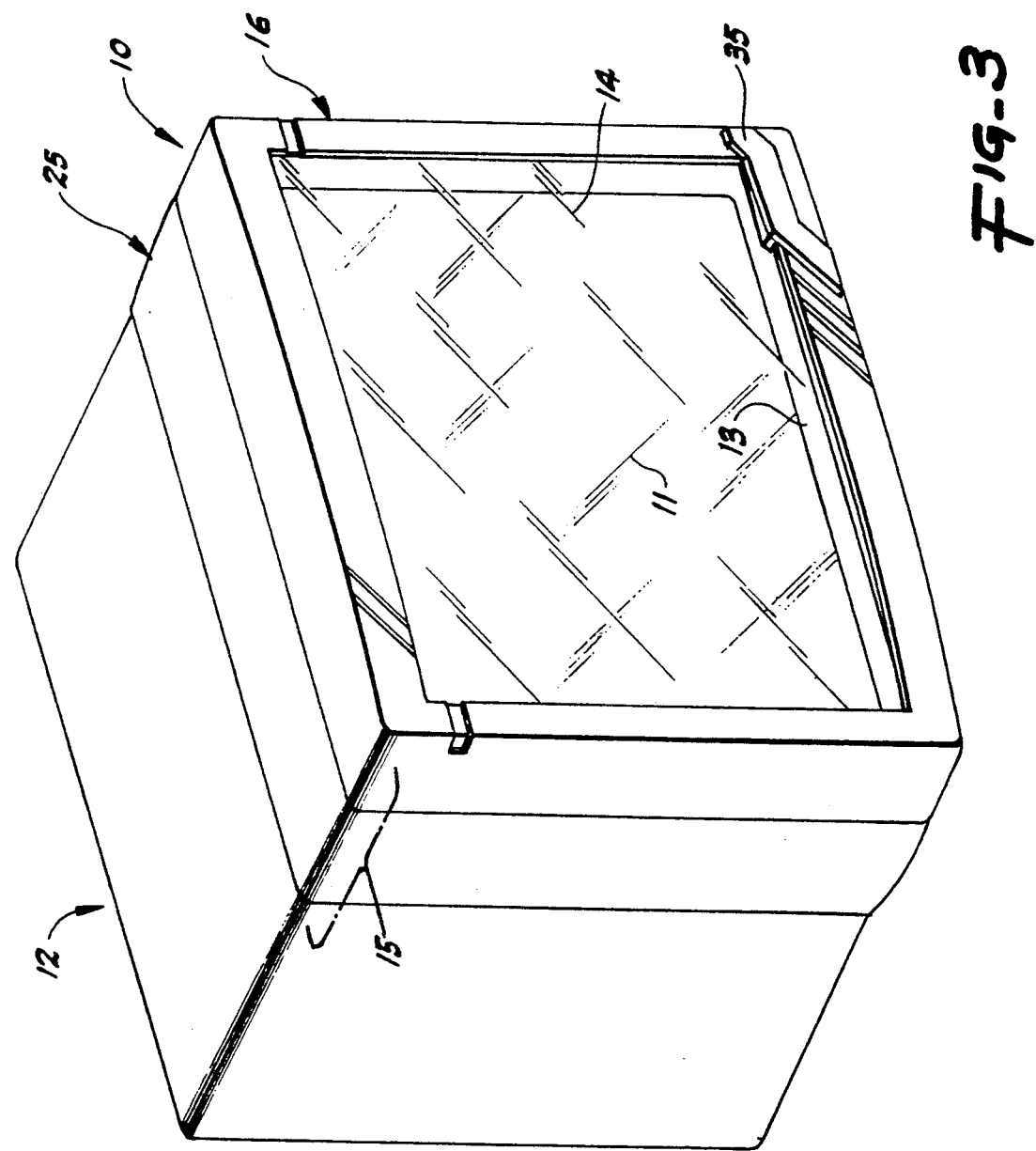

UNIVERSAL BEZEL AND ANTI-GLARE FILTER FOR MONITORS

1. BACKGROUND OF THE INVENTION

The present invention relates to devices and methods for mounting a first article such as an anti-glare filter or other cover on a second article such as a display or monitor. In particular, the present invention relates to screens or optical filter covers for video displays, including computer monitors, television screens and the like.

2. DESCRIPTION OF THE STATE OF THE RELEVANT ART

Devices are available for mounting anti-glare filters on video displays such as computer or television monitors. The latest technology uses custom-fit covers having filter-mounting bezels which are designed to slip onto the front of the associated monitor. The bezels are secured to the monitor by VELCRO hook and loop fasteners, by double-sided tape, or by a friction-fit between the monitor and bezel. Unfortunately, such bezels must fit perfectly, like a glove. As a consequence, substantially every monitor requires its own custom cover. Quite obviously, this complicates and increases the cost of ordering, manufacturing and stocking these articles.

3. SUMMARY OF THE INVENTION

In one aspect, our invention is embodied in a bezel, which is configured for self-mounting on a monitor, and which is designed to address shortcomings of the prior art, comprising: a relatively rigid frame having n sides approximating the configuration and size of a monitor, and further comprising a groove formed in $n-1$ sides of the frame facing the monitor; and relatively flexible lip means of selected length corresponding substantially to the peripheral length of the $n-1$ sides of the frame. The lip means comprises a tongue extending the length of the lip means for mating with the frame groove to mount the lip means to the frame; and a rearwardly and inwardly extending concave, relatively flexible lip joined to the tongue and extending the length of the lip means and defining a generally U-shaped configuration which is open along the $n^{th}$ side of the frame. As the result of this construction and cooperation of components, the lip means slides onto the monitor via the open side and into mounting engagement with the sides of the monitor and adapts the bezel to the size of the monitor. In another aspect, the lip means may comprise separate members corresponding to the $n-1$ sides of the frame. Also, preferably the inside width of the groove is smaller than the corresponding width of the tongue, for providing an intereference fit between the two.

Our invention is not limited to polygonal configurations. Rather it applies generally to frames describing a generally closed outline which is open along one sector, region, side, etc. In this respect, the n-sided configuration is considered equivalent to and to encompass generally closed configurations and the $n-1$ side is equivalent to the open side, sector, region, etc.

In another aspect, our invention is embodied in an optical viewing device such as an anti-glare filter configured for self-mounting on monitors of different sizes. The device comprises an optical screen or plate, a bezel and a relatively flexible lip means. The bezel includes a rectangular frame mounted about the periphery of the screen or plate and having four sides approximating the configuration and size of a monitor. The frame further comprises relatively rigid bases formed on at least three of the sides, on the rearward- or monitor-facing side of the frame. The three bases have grooves formed in their rearwar-facing side. The relatively flexible lip means is of selected length corresponding substantially to the peripheral length of the three sides of the frame, and further comprises bases extending the length of the lip means and defining tongues for mating with the frame grooves, the inside widths of the grooves being smaller than the corresponding widths of the tongues, for providing an intereference fit between the two to securely mount the lip means to the frame. In addition, the lip means comprises relatively flexible, rearwardly and inwardly extending concave lips joined to the lip bases and extending the length of the lip means, defining a generally U-shaped configuration which is open along the fourth side of the frame for permitting the lip means to slide onto the monitor via the open fourth side and into engagement with the sides of the monitor. As the result of this construction and cooperation of components, when the bezel is slipped onto the monitor via the open fourth side of the relatively flexible lip means, the inwardly-extending concave lips adapt the bezel to the size of the monitor and mount the bezel to the monitor. In still another aspect, the lip means comprises separate members corresponding to the three sides of the frame. Also, the lip means may be configured with the open side corresponding to the bottom side of the monitor such that the lip means hangs on the top and lateral sides of the monitor.

In yet another aspect. our bezel or optical viewing device may comprise a corner clip configured to be mounted along the front of the frame. Indicia, instructions, logos, etc, can be formed integrally with, applied to or embedded in the front surface of the corner clip, thus providing a simple, convenient and prominent display. Typically the corner clip is mounted to the frame using screws or, preferably, by separate or integral rivets such as plastic friction-fit rivets or expanding hook-type rivets.

4. BRIEF DESCRIPTION OF THE DRAWING

The above and other aspects of our invention are described below with respect to the drawing, in which:

FIG. 3 is a perspective view of a computer monitor or the like and the anti-glare filter cover of FIG. 1.

5. DESCRIPTION OF THE PREFERRED EMBODIMENT(S)

Figure 1:
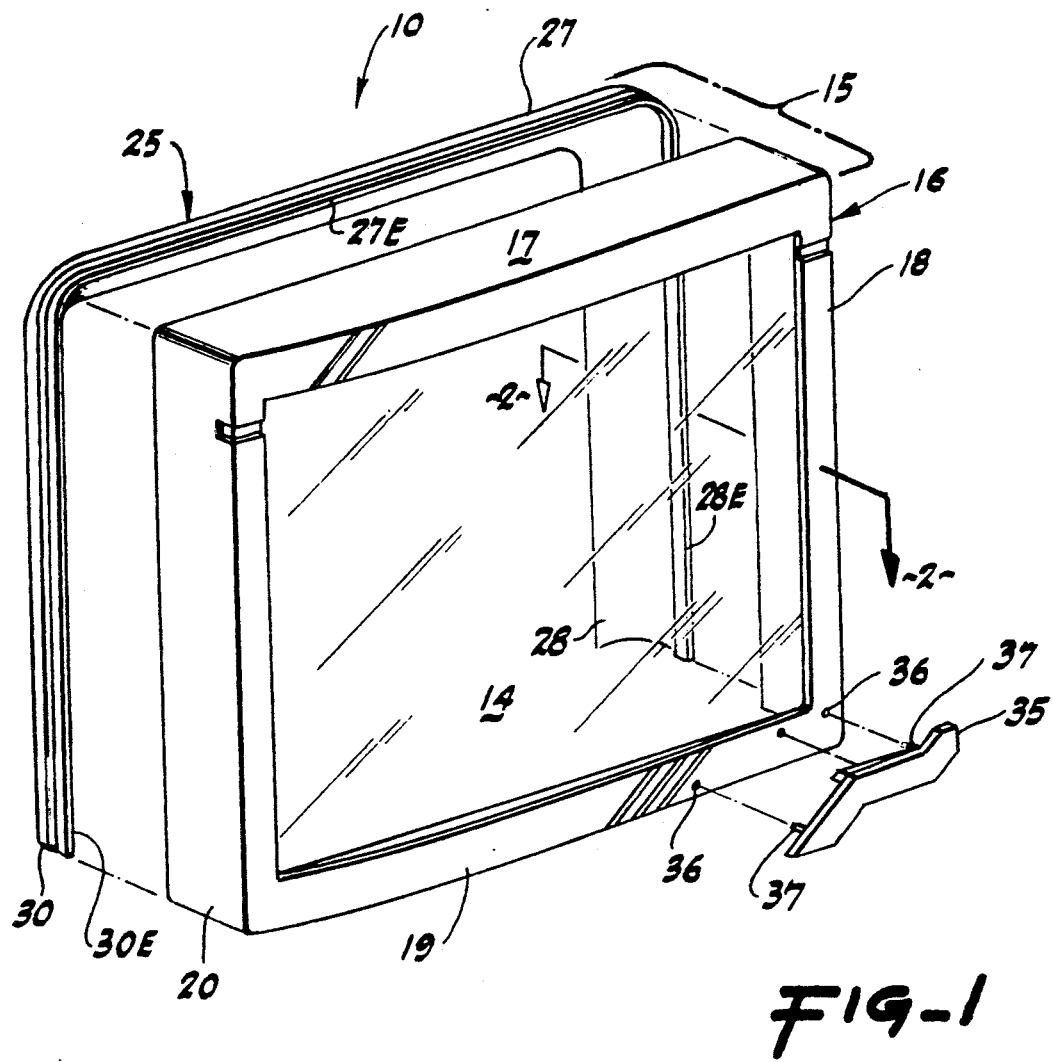
FIG. 1 is an exploded perspective view of an anti-glare filter-containing cover which is a preferred embodiment of our invention.

Referring to FIGS. 1 and 3, in a presently preferred embodiment, our invention is embodied in an anti-glare filter cover 10 or other viewing device. The device 10 is self-mounted over the display screen 11 of a video device 12 such as a television or computer monitor. Please note, our anti-glare filter device 10 is depicted in exploded fashion in FIG. 1 to facilitate understanding. Typically, the monitor 12 comprises a housing formed of rectangular top, bottom, lateral and rear sides, and a front bezel 13 which is mounted to the housing and incorporates the video display screen 11.

Figure 2:
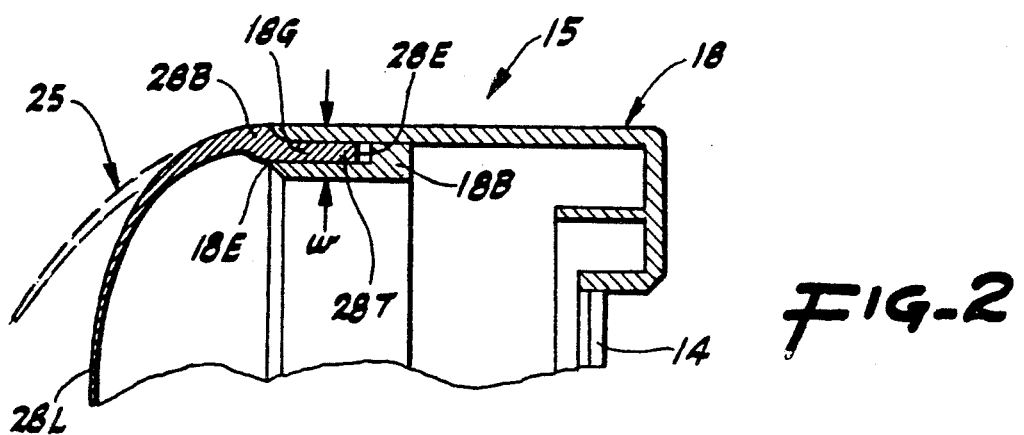
FIG. 2 is a cross-section view taken along line 2—2 in FIG. 1.

Refer now to the cross-sectional view of FIG. 2 as well as to FIGS. 1 and 3. In the preferred embodiment, our device 10 comprises (1) an optical plate or screen 14, such as a glass plate coated with an anti-glare thin film and/or other types of optical thin films, and (2) a bezel 15, which is specially adapted to self-mount over the display screen 11 and the front bezel 13 of the monitor 12 and, more specifically, over different sizes of monitors 12.

The bezel 15 comprises a rectangular frame 16, to which is mounted the screen 14 and flexible lip 25 (also called "flexible lip means"). The frame 16 includes four sides 17, 18, 19, 20, each of which is of generally L-shaped cross-section. In this regard, please refer to the FIG. 2 cross-section view, which is taken transverse to the right side frame member 18, in the direction of line 2—2, FIG. 1. Preferably, the frame 16 approximates the configuration and size of the monitor 12, FIG. 3. At least three of the four frame side members (illustratively, the top, right and left side members 17, 18 and 20) have relatively thick base sections 17B, 18B and 20B formed at their rearward-facing or monitor-facing sides or edges 17E, 18E and 20E. Also, each base has a longitudinally-extending groove 17G, 18G and 20G formed in the associated edge 17E, 18E or 20E. Please note, only edge 18E and associated base 18B and groove 18G are identified in the drawing, in FIG. 2.

Referring in particular to FIGS. 2 and 3, the lip means 25 comprises a relatively flexible plastic material such as SANTOPRENE, which is available from Monsanto Corporation, and is formed by extrusion or other known processes. Preferably, the frame member 16 is a relatively rigid plastic material such as high impact styrene, and is formed by injection molding or thermoforming or other suitable processes. The lip means 25 is mounted to the bases of the three bezel frame members 17, 18 and 20 and extends along the peripheral length of these three frame members, on the rear or monitor side thereof. The lip means 25 (1) comprises separate members or sections 27, 28 and 30 having lengths corresponding to the lengths of their associated frame members 17, 18, 20, or (2), as shown in drawing FIGS. 1 and 2, is a continuous elongated strip having members 27, 28 and 30 corresponding to the length of the frame members 17, 18 and 20. The sections 27, 28 and 30 of the lip means have relatively thick base sections 27B, 28B and 30B formed along their forward-facing or frame-facing sides or edges 27E, 28E and 30E (only base 28B is identified in the drawing). The bases 27B, 28B and 30B have longitudinally-extending tongues 27T, 28T and 30T formed in the associated edges 27E, 28E and 30E, respectively, which mate with the grooves 17G, 18G and 20G of the corresponding frame members.

Preferably the cross-sectional dimension, w, of each tongue 27T–30T is sufficiently greater than the corresponding width of the each groove 17G–20G of the associated frame members to provide an interference fit. As a result, upon insertion of the tongue(s) into the associated groove(s), the lip means 25 is securely locked onto the frame 16.

Referring in particular to FIGS. 1 and 2, the members 27, 28 and 30 include tapered, relatively flexible, rearwardly and inwardly extending, concave lips 27L, 28L and 30L, respectively, which are joined to (and preferably formed integrally with) the lip bases 27B, 28B and 30B, and extend the length of the lip means 25. Collectively, the lip members 27, 28 and 30 impart a generally U-shaped configuration to the lip means 25 which is open along the fourth side 19 of the frame. This permits the lip means 25 to slide onto the monitor 12, FIG. 3, and into engagement with the top and lateral sides of the monitor so that the frame 16 locates the anti-glare screen 14 closely adjacent the monitor screen 11. As illustrated in phantom in FIG. 2, the ability of the rigid, but somewhat flexible tapered lip members such as 28 to flex laterally allows the lip means 25 to fit over, yet conform closely to, the sides of housings of different sizes. This provides both secure mounting and a streamlined, integral appearance without requiring that the size of the frame 16 or the bezel 15 of the device 10 conform precisely to the size of the monitor.

Preferably, the lip means 25 is a continuous strip of length equal to the combined length of the three bezel frame members 17, 18 and 20, or is formed into discrete strips 27, 28 and 30 of lengths equal to the lengths of the associated bezel frame members, or is formed into an elongated strip and is then cut to the desired length, either of the continuous strip or the lengths of the individual strips.

Our bezel or optical viewing device also may comprise a corner clip 35, which is a plate that is configured to conform to, and be mounted to the front surface of, the frame 16. Indicia, instructions, logos, etc, can be formed integrally with, applied to or embedded in the front surface of the corner clip 35, thus providing a simple, convenient and prominent display. Typically the corner clip 35 is mounted to holes 36—36 in the frame using fastening means 37—37 such as screws or, preferably, by separate or integral rivets such as plastic friction-fit rivets or expanding hook-type rivets. Although the so-called corner clip 35 is conveniently mounted at or adjacent a corner of the frame, obviously the location is not so limited; rather, the clip can be mounted substantially anywhere along the frame. Also, because of the information-conveying characteristics of the corner clip, we also refer to that component here as an indicia plate.

Based upon the preferred and alternative embodiments of our invention which are described here, those of usual skill in the art will readily derive alternatives and implement modifications which are equivalent to our invention and within the scope of the claims of this patent document.

We claim:

1. A bezel configured for self-mounting on a rectangular monitor, comprising:

a relatively rigid frame having n sides approximating the configuration and size of a monitor, and further comprising a groove formed in $n-1$ sides of the frame facing the monitor; and relatively flexible lip means of selected length corresponding substantially to the peripheral length of the $n-1$ sides of the frame, the lip means comprising: a tongue extending the length of the lip means for mating with the frame groove to mount the lip means to the frame; and a rearwardly and inwardly extending concave, relatively flexible lip joined to the tongue and extending the length of the lip means and defining a generally U-shaped configuration which is open along the $n^{th}$ side of the frame, so that the lip means slides onto the monitor via the open side and into mounting engagement with the sides of the monitor and adapts the bezel to the size of the monitor.

2. The bezel of claim 1, wherein the lip means comprises separate members corresponding to the n−1 sides of the frame.

3. The bezel of claim 1, wherein the inside width of the groove is smaller than the corresponding width of the tongue, for providing an intereference fit between the two.

4. The bezel of claim 1, further comprising an indicia plate adapted for mounting along the front of the frame.

5. The bezel of claim 4, wherein the indicia plate is mounted adjacent one corner of the frame.

6. An optical viewing device such as an anti-glare filter configured for self-mounting on monitors of different sizes, comprising:

an optical screen or plate;

a bezel, comprising: a rectangular frame mounted about the periphery of the screen or plate and having four sides approximating the configuration and size of a monitor; the frame further comprising relatively rigid bases formed on at least three of the sides, on the rearward- or monitor-facing side of the frame; the three bases having grooves formed in their rearwar-facing side; and relatively flexible lip means of selected length corresponding substantially to the peripheral length of the three sides of the frame, the lip means comprising: bases extending the length of the lip means and defining tongues for mating with the frame grooves, the inside widths of the grooves being smaller than the corresponding widths of the tongues, for providing an intereference fit between the two to securely mount the lip means to the frame; and relatively flexible, rearwardly and inwardly extending concave lips, joined to the lip bases and extending the length of the lip means and defining a generally U-shaped configuration which is open along the fourth side of the frame for permitting the lip means to slide onto the monitor via the open fourth side and into engagement with the sides of the monitor;

whereby when the bezel is slipped onto the monitor via the open fourth side of the relatively flexible lip means, the inwardly-extending concave lips adapt the bezel to the size of the monitor and mount the bezel to the monitor.

7. The device of claim 6, wherein the lip means comprises separate members corresponding to the three sides of the frame.

8. The device of claim 6, wherein the lip means is configured with the open side corresponding to the bottom side of the monitor such that the lip means hangs on the top and lateral sides of the monitor.

9. The bezel of claim 6, further comprising an indicia plate adapted for mounting along the front of the frame.

10. The bezel of claim 9, wherein the indicia plate is mounted adjacent one corner of the frame.

* * * * *